United States Patent [19]
Tamura et al.

[11] Patent Number: 4,551,402
[45] Date of Patent: Nov. 5, 1985

[54] ELECTRODE SEPARATOR FOR AN ELECTRIC CELL

[75] Inventors: Tadashi Tamura, Shiga; Etsuro Nakao, Moriyama; Hiroaki Yamazaki, Ibaraki, all of Japan

[73] Assignee: Firma Carl Freudenberg, Weinheim an der Bergstrasse, Fed. Rep. of Germany

[21] Appl. No.: 552,491

[22] Filed: Nov. 16, 1983

[30] Foreign Application Priority Data

Nov. 17, 1982 [JP] Japan ............... 57-202490

[51] Int. Cl.⁴ .......................... H01M 2/16
[52] U.S. Cl. .................. 429/254; 428/399; 264/176 F
[58] Field of Search .............. 429/254, 249; 264/176 F, 177 F; 428/296, 399

[56] References Cited

U.S. PATENT DOCUMENTS

| | | | |
|---|---|---|---|
| 3,680,301 | 8/1972 | Michel | 428/399 |
| 3,849,241 | 11/1974 | Butin et al. | 264/176 F |
| 3,907,604 | 9/1975 | Prentic | 429/254 |
| 4,059,950 | 11/1977 | Negishi et al. | 428/399 |

*Primary Examiner*—Donald L. Walton
*Attorney, Agent, or Firm*—Felfe & Lynch

[57] ABSTRACT

A mat of filaments for an electrode separator of an electric cell has filaments having segments of 2–4 microns in diameter and segments of 10–30 microns in diameter to provide appropriate electrical and stiffness properties.

3 Claims, 2 Drawing Figures

ELECTRODE SEPARATOR FOR AN ELECTRIC CELL

BACKGROUND OF THE INVENTION

The invention relates to an electrode separator for an electric cell and, in particular, an electrode separator capable of holding a larger quantity of electrolyte during operation of a lithium cell.

A lithium cell has an anode of manganese dioxide or a fluorocarbon and a cathode of the metal lithium. A separator holding an organic electrolyte such as propylene carbonate, γ-butyrolactone, or dimethoxyethane is between the anode and the cathode. When the lithium cell is in use, lithium ions generated at the cathode move to the anode. The size of the anode gradually increases as the lithium ions accumulate and this subjects the separator to compression which discharges the electrolyte therefrom, leading to a reduction of the efficiency of the cell.

A compact mat of polypropylene filaments having diameters of 10μ or less has hitherto been used as the separator for the lithium cell. Quite sufficient electrolyte is held in the interstices between the fine filaments of this mat separator when it is not compressed. However, the mat separator of polypropylene filaments smaller than 10μ in diameter lacks sufficient stiffness to resist the compression caused by the expansion of the anode of the lithium cell to result in the discharge of the electrolyte and the lowering of the efficiency of the cell, as described.

To eliminate the above defect, the use of polypropylene filaments thicker than 10μ in diameter could be considered, but the increase in the diameter of the filaments increases the dimensions of the interstices between the filaments, thereby spoiling the essential role of the separator in preventing short circuits.

SUMMARY OF THE INVENTION

The inventors of this invention have achieved their results by discovering that filaments having both large-diameter segments and small-diameter segments are as stiff as required and, when collected into a mat and continuous therein, enable the interstices formed therebetween to be sufficiently small in size.

That is to say, this invention relates to a separator for an electric cell characterized in that a plurality of filaments, each of which have segments 2–4μ in diameter and segments of 10–30μ in diameter, are collected into a mat and continuous therein to compose said separator, the proportion of segments of 2–4μ diameter and those of 10–30μ diameter being 30–50% and 20–40%, respectively, of the total in a unit area of said mat of filaments.

DESCRIPTION OF THE PREFERRED EMBODIMENTS

Figure 1:
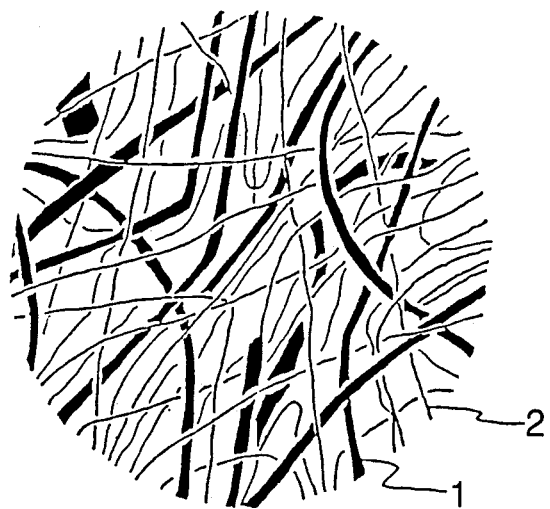
FIG. 1 is an enlarged plan view of a portion of a separator mat.

FIG. 1 shows a portion of an electrode-separator mat for an electric cell having filaments with segments 1 of 10–30 microns and segments 2 of 2–4 microns in diameter.

A wide variety of endless continuous filaments such as polypropylene, polyethylene, polyamide, polyester, etc., can be used in this invention. Of these, polypropylene and polyethylene filaments which have an excellent acidification resistance are suitable for use in a lithium cell.

The endless continuous filaments have segments of 2–4μ and segments of 10–30μ in diameter, the former serve to ensure there are small interstices in the mat of filaments, whereas the latter act to increase the stiffness of the filaments themselves. According to this invention, the 2–4μ diameter segment and the 10–30μ diameter segments continue from one each other and therefore sharp reductions in the stiffness of the filaments rarely occur even in the segments with a 2–4μ diameter which would happen if these segments were separated from each other. Consequently, a mat of these such filaments possesses a sufficient resilience as a whole and discharges hardly any of the electrolyte held therein even when compressed by the electrode plate.

An endless continuous filament usually has segments that are thinner than 2μ in diameter, some that exceed 4μ but are less than 10μ, and some that exceed 30μ. In this invention, however, the proportion of segments of 2–4μ in diameter and those of 10–30μ in diameter are made to be 30–50% and 20–40%, respectively, of the total in a unit area of a mat of filaments. When the proportion of segments of 2–4μ in diameter is less than 30% the formation of interstices in the mat of filaments becomes difficult, and when it exceeds 50% the proportion of 10–30μ diameter segments will be reduced, thereby reducing the resilience of the mat of filaments. When the proportion of 10–30μ diameter segments decreases to below 20% the resilience of the filament mat reduced, and when it increases to above 40% the proportion of 2–4μ diameter segments is reduced, thereby making it difficult for interstices to form in the filament mat.

The term "unit area of a mat of filaments" can apply to an area of any dimensions so long as at least 50 endless continuous filaments can be observed therein. Usually, the area of the visual range observed through a microscope at a magnification which enables the determination filament diameters may be taken as the unit area. The term "percentage ε %)" applied to the proportion of segments means the ratio of the number of filaments of a certain fixed diameter to the total number of filaments in a unit area.

When a mat of filaments constructed as described above is used as a separator for a lithium cell, hardly any electrolyte contained therein is discharged even if the separator is compressed by the expansion of the anode plate, and no deterioration of the function of the cell occurs. This mat of filaments possesses a large electrolyte-holding capacity and can suitably be used as a separator for cells other than lithium ones.

Figure 2:
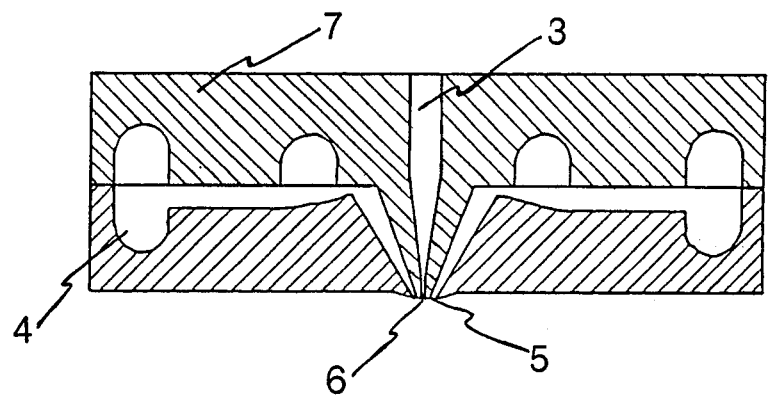
FIG. 2 is a cross section of a device for use in the method of the invention.

A method of manufacturing a separator for a cell according to this invention will now be described. To embody this method, a device as shown in FIG. 2 (cross section) can be advantageously used. A filament-forming synthetic resin such as polypropylene, polyethylene, polyamide, polyester, etc., is fed into a nozzle orifice 3. The apparent viscosity in the nozzle orifice 3 is fixed at an appropriate value and, in this invention, is preferably 300–500 poise. When molten resin is drawn at a viscosity of less than 300 poise, the resin filaments tend to break so that the spinning of a continuous filament is made difficult. When the viscosity exceeds 500 poise, the quantity of molten resin being drawn decreases, thereby reducing the production efficiency.

The molten resin in the nozzle orifice 3 flows toward the outlet 6 and, as it flows out of the outlet 6, it becomes a filament having a diameter approximately equal to that of the outlet 6. In this invention, the recommended diameter of the outlet 6 ranges from 0.2 to 0.4 mm. Fluid is blown from slots 5 positioned beside the nozzle orifice 3 so as to draw the molten resin downward. The fluid blown from the slots 5 begins to act on the molten resin at a position 0.3–2.2 mm away from the outlet 6 and not immediately after the molten resin flows out of the outlet 6. In this invention, it is not possible to allow the fluid to act on the molten resin at a position in close proximity to the outlet 6 because the spun molten resin will tend to break and the laminar flow in the slots 5 will not become a turbulent flow.

The application of a turbulent fluid flow to the spun molten resin is a characteristic of this invention. The turbulent of the fluid occurs naturally at a fixed position separated from the slots, and is due to the expansion of the fluid flowing from the slots 5 at high speed. The application of a laminar flow of fluid to the spun molten resin produces a filament with a uniform diameter, whereas a turbulent flow of fluid produces an irregular filament. In this way, an endless continuous filament having segments of 2–4μ in diameter and those of 10–30μ in diameter can be produced.

The acting point of the turbulent flow of fluid is 0.3–2.2 mm from the outlet 6 of the orifice. If the distance is shorter than 0.3 mm, a continuous filament with an irregular diameter can not be spun, and, if the distance exceeds 2.2 mm, the stretching and thinning of the filament becomes difficult because of the solidification of the spun molten resin.

The speed of drawing the molten resin varies according to the apparent viscosity of the resin in the nozzle orifice and the quantity of fluid blown. In this invention, a speed between 0.04 and 0.3 g/min/orifice is preferable, and is particularly so when the apparent viscosity in the nozzle orifice is between 300 and 500 poise. When the drawing speed is below 0.04 g/min/orifice, the production efficiency tends to decrease, and when it is above 0.3 g/min/orifice, the viscosity of the molten resin must be reduced to thin the filament, in both these cases the molten resin tends to break and droplets of resin are liable to be produced.

When generating a high speed turbulent flow of fluid, the use of a fluid which does not react with the molten resin, for example nitrogen or water vapor, is preferable. In particular, the application of heated air is recommended because of its ability of preventing the deterioration of the molten resin. A high speed turbulent flow of fluid, in particular that of heated air, should preferably be applied to the molten resin at a rate of 40–100 g per gram of molten resin. If it is less than 40 g, the thinning and stretching of the molten resin becomes difficult, and if it is more than 100 g, the filaments are liable to break.

A large number of nozzle orifices 3 and slots 5 such as those shown in FIG. 2 are provided in the linear direction running from the plane of the drawing toward the rear thereof. Therefore, the continuous filaments drawn from nozzle orifices 3 are collectively laid on a collecting surface (not shown) disposed at a lower position, and the filaments are entangled with the others drawn from the plurality of adjoining nozzle orifices so as to form a sheet-like mat of filaments.

The sheet-like mat of filaments is pressed, if desired, to make the mat of filaments more compact and reduce the dimensions of the interstices between the filaments to the minimum. Pressing at room temperature may be sufficient.

A few examples will be described below for a more complete standing of this invention.

EXAMPLE 1

A molten substance obtained by the process of heating pellets or polypropylene resin was poured through the nozzle orifices of a device such as that shown in FIG. 2, the viscosity thereof being fixed at 400–450 poise, and was drawn through outlets 6 of 0.3 mm diameter, thereby being turned into individual fine filaments by heated air fed from fluid chambers 4. The point at which the hot air acted on the molten resin was 0.47 mm from the outlet 6. The speed of drawing the molten substance was set at 0.06 g/min/orifice, and the quantity of heated air was 90 g per gram of molten substance.

Under the above conditions, continuous filaments were spun through outlets 6 separated linearly at intervals of 1 mm, were laid on a collecting screen, were pressed under a linear pressure of 50 kg/cm at room temperature, and cut into the shape required for a separator for a cell.

This separator for the cell weighed 40 g/m$^2$ and was 0.12 mm thick, and the proportion of segments of 2–4μ diameter and those of 10–30μ diameter were 45±5% and 25±5%, respectively, in a unit area thereof.

EXAMPLE 2

A separator for a cell was obtained under the same conditions as those of Example 1 except that the place at which the heated air acted on the molten substance was 0.9 mm from the outlets 6. This positional change of the action point was effected by changing the distance between each outlet and its slots.

In the separator thus obtained, the proportion of segments of 2–4μ in diameter and those of 10–30μ in diameter were each 35±5%, in a unit area. The weight and thickness of this separator were the same as that of Example 1.

EXAMPLE 3

The process conditions were set in the same way as those in Example 1 except that the apparent viscosity of the molten substance in the nozzle orifices 3 was maintained at 330–380 poise, the speed of drawing the molten substance was fixed at 0.13 g/min/orifice, the quantity of heated air was fixed at the rate of 50 g per gram of molten substance, and the speed of the conveyor was multiplied by 2.17.

The separator thus obtained weighed 40 g/m$^2$ and was 0.12 thick, the proportion of segments of 2–4μ in diameter and those of 10–30μ in diameter were each 35±5%, in a unit area.

The electrolyte-holding capacity of the separators obtained according to the above methods were as shown in Table 1, which proves the superiority of the product according to this invention.

TABLE 1

|  | Electrolyte-holding capacity | | | | |
| --- | --- | --- | --- | --- | --- |
|  | 1 min | 2 min | 3 min | 4 min | 5 min |
| Example 1 | 58% | 53% | 48% | 44% | 44% |
| Example 2 | 60% | 55% | 50% | 45% | 45% |
| Example 3 | 60% | 55% | 50% | 45% | 45% |

TABLE 1-continued

| | Electrolyte-holding capacity | | | | |
|---|---|---|---|---|---|
| | 1 min | 2 min | 3 min | 4 min | 5 min |
| Conventional separator | 50% | 45% | 42% | 39% | 35% |

The structure of the conventional separator and the testing method were as follows:

(1) Structure

A separator for a cell was composed of endless continuous filaments of polypropylene, each being 7–10$\mu$ in diameter, collected into a mat which weighed 40 g/m$^2$ and was 0.12 mm thick.

(2) Testing method

The electrolyte-holding capacity was successively measured after the lapse of 1, 3, and 5 minutes after each of the test specimens, impregnated with an electrolyte of propylene carbonate, was laid on a sheet of filter paper spread over a glass plate, and covered with another sheet of filter paper on which an acrylic resin plate weighing 20 g was laid. The capacity is expressed in percentage terms (%) according to the formula below. The larger the percentage, the better the electrolyte-holding capacity.

$$W_1/W_0 \times 100 = (\%)$$

$W_o$ . . . initial quantity of impregnated electrolyte
$W_1$ . . . quantity of electrolyte retained after the lapse of a certain length of time

What is claimed is:

1. An electrode separator for an electric cell, comprising: a mat of a collected plurality of filaments which are continuous in the mat, each filament having segments of 2–4$\mu$ in diameter and segments of 10–30$\mu$ in diameter, the proportions of segments of 2–4$\mu$ in diameter and those of 10–30$\mu$ in diameter being 30–50% and 20–40%, respectively, of the total in a unit area of the mat of filaments.

2. The separator for an electric cell as set forth in claim 1, wherein said filaments are polypropylene or polyethylene.

3. The separator for an electric cell as set forth in claim 1 wherein the plurality of filaments are entangled with each other in the mat.

* * * * *